United States Patent [19]

Phillips

[11] Patent Number: 4,907,780
[45] Date of Patent: Mar. 13, 1990

[54] COMBINED SEAL AND ACTUATOR SUPPORT

[76] Inventor: Edwin D. Phillips, 700 Cedar Ave., Middlesex, N.J. 08846

[21] Appl. No.: 186,928

[22] Filed: Apr. 27, 1988

[51] Int. Cl.[4] .................. F16K 41/00; F16K 31/50
[52] U.S. Cl. ...................................... 251/214; 251/224; 251/225; 251/368; 277/110; 277/165
[58] Field of Search .............. 251/214, 215, 216, 221, 251/222, 224, 225, 368; 277/110, 112, 165; 285/354, 355

[56] References Cited

U.S. PATENT DOCUMENTS

| | | | |
|---|---|---|---|
| 222,870 | 12/1879 | Cooper | 251/224 |
| 1,007,554 | 10/1911 | Glauber | 251/224 |
| 1,106,933 | 8/1914 | Farley | 251/214 |
| 1,107,205 | 8/1914 | Schulder | 251/224 |
| 3,007,671 | 11/1961 | Bartlett | 251/224 |
| 3,455,563 | 7/1969 | Gies et al. | 277/165 |
| 3,494,624 | 2/1970 | Woodling | 277/165 |
| 3,658,290 | 4/1972 | Peters et al. | 251/215 |
| 4,183,501 | 1/1980 | Flynn | 251/215 |
| 4,601,310 | 7/1986 | Phillips | 277/165 |
| 4,669,763 | 6/1987 | Phillips | 285/911 |

FOREIGN PATENT DOCUMENTS 2010050 9/1971 Fed. Rep. of Germany ...... 251/214

Primary Examiner—George L. Walton
Attorney, Agent, or Firm—Shoemaker and Mattare, Ltd.

[57] ABSTRACT

A combined seal and actuator support for valves, in which a sleeve is engaged between the actuator shaft of the valve and the valve body to effect a seal between the shaft and body, and wherein complementally interengaged actuator means are on the sleeve and shaft to support and effect reciprocating movement of the shaft, thereby eliminating the need for expensive o-ring seals and other expensive manufacturing techniques.

7 Claims, 1 Drawing Sheet

COMBINED SEAL AND ACTUATOR SUPPORT

FIELD OF THE INVENTION

This invention relates to seals for valves, and particularly those used in corrosive environments, or in laboratory apparatus, and the like. More specifically, the present invention relates to a combined seal and actuator support for a valve.

PRIOR ART

Seals for sealing against fluid loss in valves and pipelines, for example, currently include various designs embodying one or a combination of o-rings, gaskets, diaphragms, bellows and the like. The use of o-rings and gaskets is probably most common, but in some installations involving corrosive materials such seals may not be suitable because of their exposure to the corrosive environment and the resultant need to make the seals of an expensive material capable of resisting the corrosive environment. Moreover, in order for an o-ring seal to be effective in its sealing function the tolerances of mating or adjacent components must be kept within carefully controlled limits.

For instance, in the manufacture of various glass shut off and metering valves used in the chemical industry, there is a major problem of increasing costs in materials and the highly skilled labor needed to make such apparatus. For instance, glass bodies used in such apparatus frequently require side-opening passages. In the presently designed valves which use o-rings to form a seal between the inner surface of the glass valve body and the outer surface of the actuator or valve member, there are three principal factors affecting the skill and cost required in making such valves. They are: the glass tubing used in forming the valve body must be precision bore tubing; the side-opening passage must be precisely located; and the distortion of the inner glass wall must be kept to a minimum to stay within the tolerance limits of the o-ring seal, requiring a high degree of skill by the glass worker. Valves are usually made longer than necessary in order to minimize these problems, although without much success.

SUMMARY OF THE INVENTION

Accordingly, it is a primary object of the present invention to provide a seal for sealing the actuator relative to the body of a valve used in corrosive environments, in which the need for expensive o-rings or other expensive manufacturing techniques is eliminated.

Another object of the invention is to provide a combined seal and actuator means for valves, in which the means effects a seal between the actuator and the valve body and also supports the actuator for operation.

BRIEF DESCRIPTION OF THE DRAWINGS

These and other objects and advantages of the invention will become apparent from the following detailed description when considered with the accompanying drawings, in which like reference characters designate like parts throughout the several views, and wherein.

DETAILED DESCRIPTION OF THE PREFERRED EMBODIMENTS

Figure 2:
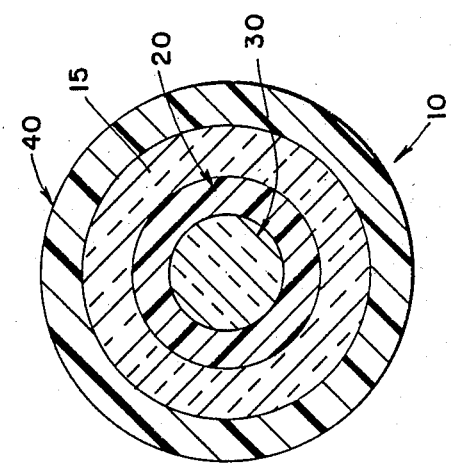
FIG. 2 is a transverse sectional view taken along line 2-2 in FIG. 1.
Figure 1:
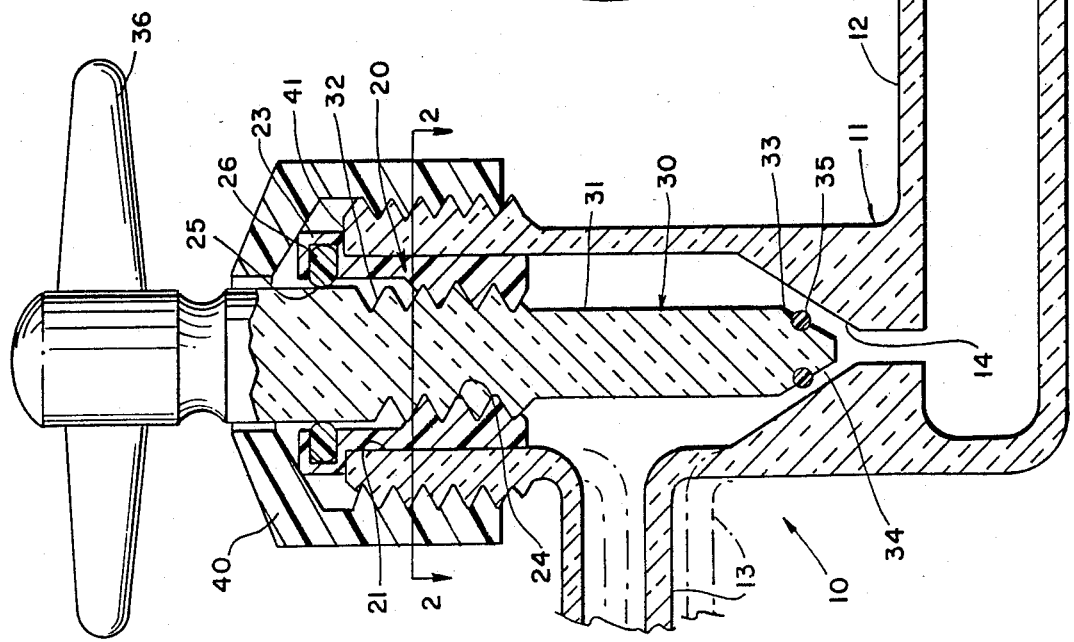
FIG. 1 is a longitudinal sectional view taken through a first form of valve according to the invention.

Referring more particularly to the drawings, a first form of valve according to the invention is indicated generally at 10 in FIGS. 1 and 2, and comprises a glass valve body 11 having an inlet 12 and outlet 13, with a valve seat 14 therebetween. An extension 15 is formed on the body for mounting the valve and actuator. As indicated in dot-and-dash lines in FIG. 1, the position of the side-opening outlet port 13 may vary over a wide range without adversely affecting the sealing effectiveness of the invention.

In accordance with the invention, a unique seal and actuator sleeve 20 is fitted within the open end 21 of the valve body extension 15. The seal and actuator sleeve includes a cylindrical body 22 which extends in close fitting engagement inside the valve body extension, a radially outwardly directed flange 23 engaged against the end surface of the valve body extension, and a set of internal threads 24 in the cylindrical body for cooperation with the valve actuator, described hereinafter. The threads may be right or left-hand, or may be double acting, as desired. An o-ring 25 is fitted within an annular channel 26 on the inner surface of the sleeve, and forms a support and o-ring seal as more fully described in applicant's earlier Pat. No. 4,669,763. The sleeve may be made of any suitable material, depending upon the environment in which it is to be used. An example of one suitable material is Teflon, which produces a good seal. However, an important consideration is the shear strength of the sleeve. In the arrangement shown in FIG. 1, the valve might be used in environments which are not particularly corrosive, or example, since the o-ring 25 in this form of the invention is exposed to the material being controlled by the valve.

A valve and actuator member 30 is supported in the sleeve 20, and includes an elongate shaft 31 having threads 32 on a portion thereof for mating cooperation with the threads 24 in the sleeve The inner end 33 of the member 30 is tapered as at 34, and, in the form shown, has an annular channel therein with an o-ring valve sealing member 35 engaged in the channel for cooperation with the valve seat 14. A hand grip 36 may be provided on the outer end of the shaft 31. In the form shown, the valve and actuator member 30 may be made of any suitable material, including glass.

A retainer 40 is threadably engaged over the end of the valve body extension 15 to maintain the parts in assembled relationship, and to effect a seal between the flange 23 and the end of the valve body extension at 41, in a manner more fully explained in Pat. No 4,669,763. The o-ring 25 carried in the sleeve effects a seal with the shaft 31. The retainer cap 40 may be made of any suitable material, including plastic or metal.

Figure 3:
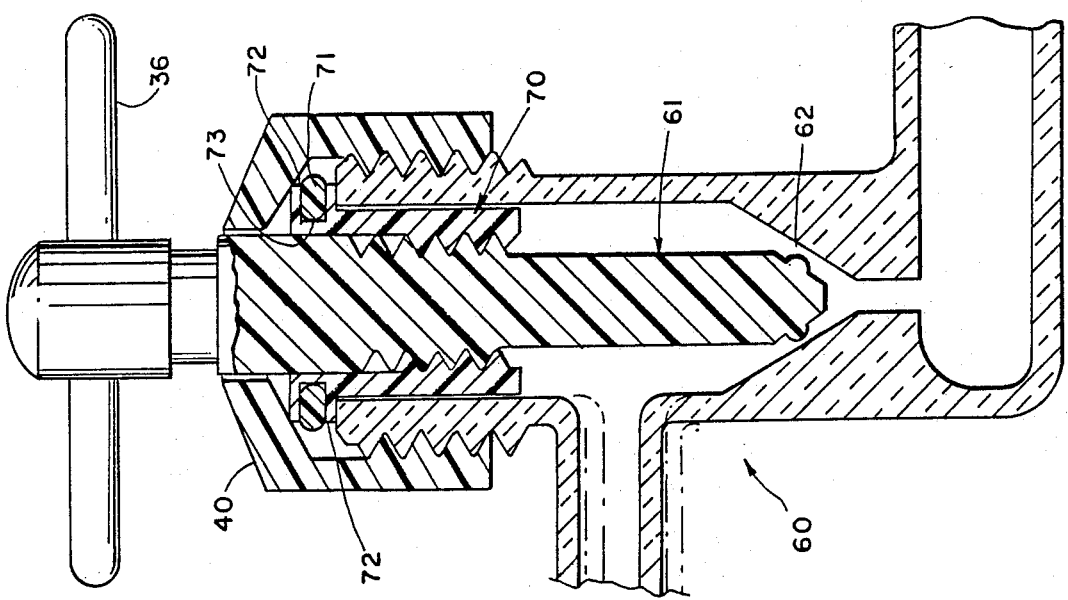
FIG. 3 is a longitudinal sectional view of a second form of valve according to the invention.

A variation of the invention is indicated generally at 60 in FIG. 3. In this form of the invention, the valve and actuator shaft or stem 61 is made of a material resistant to corrosion, such as Teflon, and the valve sealing member 62 is integrally formed with the shaft.

Additionally, the combined actuator and seal sleeve 70 is modified, in that the relationship of the channel 71 and o-ring 72 is reversed from that shown in FIG. 1. In this form of the invention the o-ring 72 is not exposed to the corrosive environment of the fluid being controlled by the valve. Sealing between the sleeve 70 and actuator shaft 61 is effected by deformation of the sleeve at 73 into firm sealing engagement with the shaft under the compressive force exerted by the retainer cap 40, all as more fully explained in Pat. No. 4,669,763.

Although the invention has been described with reference to a particular embodiment. It is to be understood that this embodiment is merely illustrative of the application of the principles of the invention. Numerous modifications may be made therein and other arrangements may be devised without departing from the spirit and scope of the invention.

I claim:

1. In a valve having a valve body with an inlet and an outlet, a valve seat between the inlet and outlet, and a valve member carried by an actuator shaft for movement toward and away from the valve seat, the improvement comprising:

an elongate, combined seal means and actuator support sleeve engaged in said housing between said actuator shaft and the housing for effecting a seal between the shaft and housing and for supporting the actuator shaft for actuation in the housing, said support sleeve having a portion with threads therein engaged with complemental means on the actuator shaft to effect movement of the shaft toward and away from the valve seat when the shaft is turned in the sleeve, and an unthreaded portion slidably and sealably engaged with said shaft to effect a seal and support for said shaft, said sleeve having one end engaged against an end of said body and held clamped thereto by a retaining nut engaged on said end of said body, and said seal means including an annular channel in said one end of the support sleeve, with a resilient ring means engaged therein to impart a residual bias thereto and maintain said one end in sealing engagement with the body and with the actuator shaft when the retaining nut is tightened against said one end of said sleeve.

2. A valve as claimed in claim 1, wherein:
the valve body has a cylindrical extension thereon, through which the actuator shaft extends coaxially therewith; and
said sleeve has a cylindrical body portion extending coaxially between the shaft and valve body extension, said cylindrical body portion having said threads for complemental engagement with the actuator shaft to cause movement of the shaft toward and away from the valve seat.

3. A valve as claimed in claim 2, wherein:
said interengaged thread comprise internal threads in the cylindrical body portion of the sleeve, for complemental engagement with threads on the actuator shaft, whereby rotation of the shaft causes it to advance or retract relative to the valve seat, depending upon the direction of rotation.

4. A valve as claimed in claim 3, wherein:
said one end of said sleeve has a radially directed flange thereon, said annular channel being formed in said flange, and said resilient ring means comprising an O-ring.

5. A valve as claimed in claim 4, wherein:
the actuator shaft has a forward or inner end, and the valve member comprises an o-ring engaged in an annular channel in the forward end of the shaft.

6. A valve as claimed in claim 5, wherein:
the actuator shaft is made of glass.

7. A valve as claimed in any one of claims 2,3,5,6, wherein:
the valve body is made of glass, and the sleeve is made of plastic.

* * * * *